US008972180B1

(12) United States Patent  (10) Patent No.: US 8,972,180 B1
Zhao et al.  (45) Date of Patent: Mar. 3, 2015

(54) METHOD AND APPARATUS FOR MANAGING MULTIPLE SENSORS IN A NAVIGATION SYSTEM

(71) Applicant: Marvell International Ltd., Hamilton (BM)

(72) Inventors: Xing Zhao, Sunnyvale, CA (US); Zhike Jia, Fremont, CA (US); Xin Zhang, Shanghai (CN); Jing Yu, Shanghai (CN)

(73) Assignee: Marvell International Ltd., Hamilton (BM)

( * ) Notice: Subject to any disclaimer, the term of this patent is extended or adjusted under 35 U.S.C. 154(b) by 153 days.

(21) Appl. No.: 13/671,876

(22) Filed: Nov. 8, 2012

Related U.S. Application Data

(60) Provisional application No. 61/557,285, filed on Nov. 8, 2011, provisional application No. 61/557,291, filed on Nov. 8, 2011, provisional application No. 61/564,787, filed on Nov. 29, 2011, provisional application No. 61/676,480, filed on Jul. 27, 2012.

(51) Int. Cl.
*G01C 21/00* (2006.01)
*G01C 21/16* (2006.01)

(52) U.S. Cl.
USPC .......................................................... 701/468

(58) Field of Classification Search
CPC ........ G01C 21/00; G01C 21/20; G01C 21/206; G01C 21/26; G01C 21/28
USPC .......................................................... 701/468
See application file for complete search history.

(56) References Cited

U.S. PATENT DOCUMENTS

| 7,191,281 B2 * | 3/2007 | Bajikar | .......................... 711/112 |
| 2003/0003943 A1 * | 1/2003 | Bajikar | .......................... 455/550 |
| 2011/0066364 A1 * | 3/2011 | Hale | .............................. 701/201 |

* cited by examiner

*Primary Examiner* — Mary Cheung
*Assistant Examiner* — Anne Mazzara (57) ABSTRACT

A mobile device operable in multiple navigation modes and includes navigation devices, a mode selection module, and a power management module. The navigation devices provide respective data associated with at least one of movement, a position, and a location of the mobile device. Each of the navigation devices is individually operable in an active mode and at least one of an inactive mode and a sleep mode. The mode selection module receives the respective data and selects one of the navigation modes based on the data received from one of the navigation devices. Each of the navigation modes corresponds to different ones of the navigation devices operating in the active mode. The power management module, based on the selected one of the navigation modes, transitions the navigation devices between the active mode and the at least one of the inactive mode and the sleep mode.

20 Claims, 8 Drawing Sheets

METHOD AND APPARATUS FOR MANAGING MULTIPLE SENSORS IN A NAVIGATION SYSTEM

CROSS-REFERENCE TO RELATED APPLICATIONS

This disclosure claims the benefit of U.S. Provisional Application No. 61/557,285, filed on Nov. 8, 2011, U.S. Provisional Application No. 61/557,291, filed on Nov. 8, 2011, 61/564,787, filed on Nov. 29, 2011, and U.S. Provisional Application No. 61/676,480, filed on Jul. 27, 2012. The disclosures of the applications referenced above are incorporated herein by reference.

FIELD

The present disclosure relates to management of multiple sensors in a navigation system.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Mobile devices (including, but not limited to, portable navigation devices, smartphones, and/or tablet computers) may include navigation systems such as various types of global navigation satellite system (GNSSs) receivers, wireless communication transceivers, sensors, and combinations thereof. A mobile device including a GNSS receiver (e.g., a global position system, or GPS) can receive signals from one or more satellites of the GNSS and determine a location of the mobile device based on the signals received from the one or more satellites of the GNSS. A mobile device including a wireless communication transceiver (e.g., a Wi-Fi transceiver) in communication with one or more access points or base stations can also determine a location of the mobile device based on communications with the one or more access points or base stations. A mobile device may also include various sensors that can provide additional data indicative of an orientation, acceleration and/or the location of the mobile device.

SUMMARY

A mobile device operable in multiple navigation modes is provided and includes navigation devices, a mode selection module, and a power management module. The navigation devices are configured to provide respective data associated with at least one of movement, a position, and a location of the mobile device. Each of the navigation devices is individually operable in an active mode and at least one of i) an inactive mode and ii) a sleep mode. The mode selection module is configured to i) receive the respective data and ii) select one of the navigation modes based on the data received from one of the navigation devices. Each of the navigation modes corresponds to different ones of the navigation devices operating in the active mode. The power management module is configured to, based on the selected one of the navigation modes, transition the navigation devices between the active mode and the at least one of i) the inactive mode and ii) the sleep mode.

A method of operating a mobile device in multiple navigation modes is provided. The method includes providing, via multiple navigation devices, respective data associated with at least one of movement, a position, and a location of the mobile device. Each of the navigation devices is individually operable in an active mode and at least one of i) an inactive mode and ii) a sleep mode. The method further includes receiving the respective data and selecting one of the navigation modes based on the data received from one of the navigation devices. Each of the navigation modes corresponds to different ones of the navigation devices operating in the active mode. Based on the selected one of the navigation modes, the navigation devices are transitioned between the active mode and the at least one of i) the inactive mode and ii) the sleep mode.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

Like reference symbols in the various drawings indicate like elements.

DESCRIPTION

A mobile device according to one or more embodiments of the present disclosure (including, but not limited to, portable navigation devices, smartphones, and/or tablet computers) includes navigation devices associated with two or more different types of navigation and/or position systems. For example only, the navigation devices include a global navigation satellite system (GNSS) receiver, a wireless communication transceiver, various sensors, and/or combinations thereof.

In one embodiment, a mobile device is configured to operate in a plurality of modes based on characteristics such as, for example, a location of the mobile device, available battery power, available navigation systems, and desired usage of the device. Each of the plurality of modes corresponds to operation of a respective combination of the navigation devices. For example, in a first mode, all of the navigation devices in the mobile device may be used (i.e., powered on and in a "normal" or active mode). Conversely, in a second mode, one or more of the navigation devices may be powered down (i.e., in an inactive mode). In still another mode, one or more of the navigation devices may be operated in a reduced power mode (e.g., reduced duty cycle) or sleep mode. In the sleep mode, some circuits of the corresponding navigation device may still be active (i.e., powered) while other circuits are powered down or operated at a reduced duty cycle to reduce a turn-on time of the navigation device when transitioning the navigation device from the sleep mode to the active mode.

In one embodiment, the various navigation devices are associated with different power requirements and consumption. A GNSS receiver such as a global positioning system (GPS) receiver operating in the active (e.g., continuous tracking) mode may require, for example only, 30-60 mA. In a reduced duty cycle mode, the GPS receiver may require 8 mA. In the sleep mode, the GPS receiver may require only 20 µA. A wireless communication transceiver operating in the active (e.g., continuous and/or standby) mode may require, for example only, 30-200 mA.

In one embodiment, the mobile device includes various sensors (e.g., integrated physical, position, orientation, and/or movement sensors) including, but not limited to, a 3-axis accelerometer, a 3-axis gyroscope, a magnetometer, and/or a barometer. The sensors may include microelectromechanical systems (MEMS) sensors. The sensors, in one embodiment, require less power to operate than the GPS receiver and the wireless communication transceiver. For example only, the accelerometer may require 0.01-0.1 mA at 50 Hz to operate in the active mode. The gyroscope may require 3-6 mA to operate in the active mode 1-2 mA to operate in the sleep mode at 50 Hz. The magnetometer may require 0.1-0.3 mA at 8 Hz to operate in the active mode.

Figure 1:
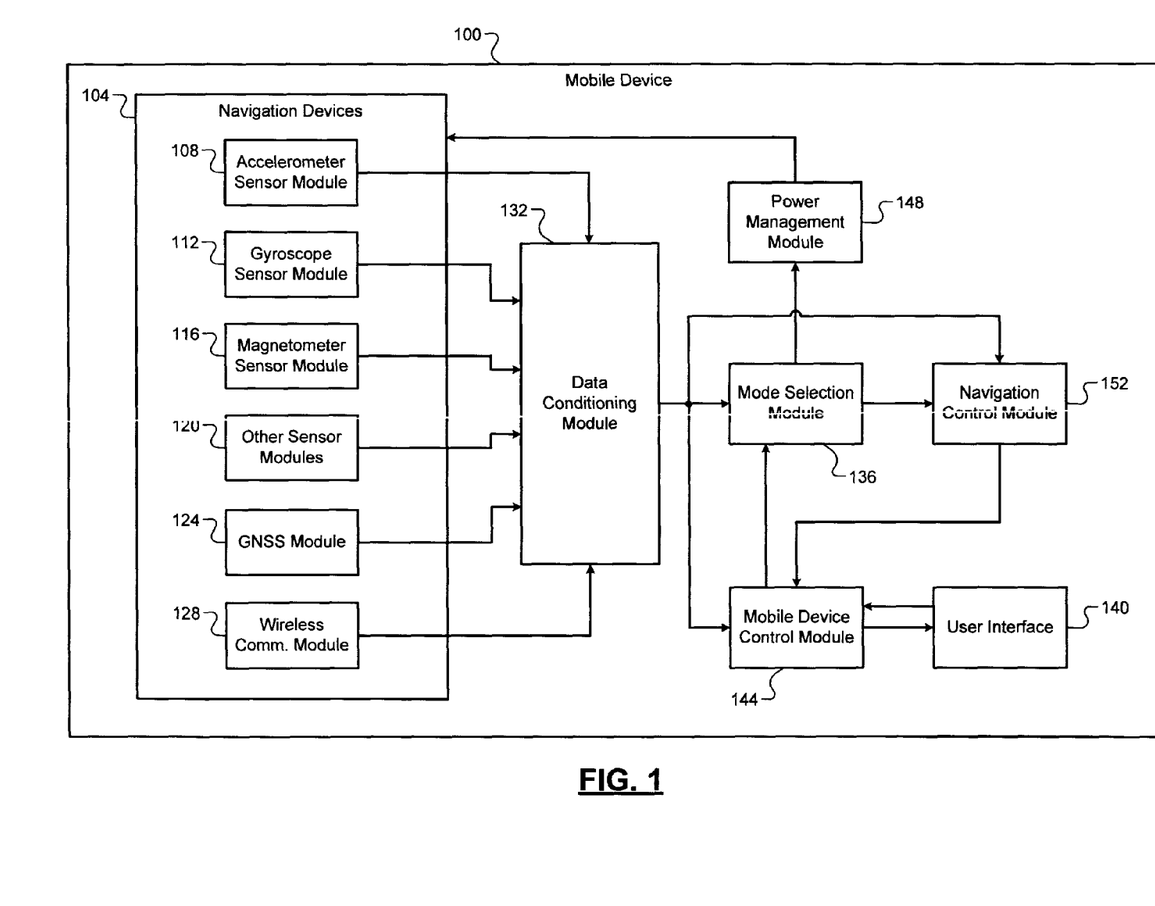
FIG. 1 is a functional block diagram of an example mobile device according to an embodiment of the present disclosure.

Referring now to FIG. 1, a mobile device 100 includes a plurality of navigation devices 104 including, but not limited to, an accelerometer sensor module 108, a gyroscope sensor module 112, a magnetometer sensor module 116, other sensor modules (e.g., a barometer sensor, an ambient light sensor, a proximity sensor, and/or a temperature sensor) 120, a GNSS module 124, and a wireless communication module 128. Each of the navigation devices 104 is individually operable in an active (i.e., powered up) mode, an inactive (i.e., powered down) mode, a sleep (i.e., a reduced power) mode, and/or a reduced duty cycle mode.

The accelerometer sensor module 108 includes, for example, a 3-axis accelerometer sensor and provides data indicative of movement of the mobile device 100 to a data conditioning module 132. The gyroscope sensor module 112 includes, for example, a 3-axis gyroscope sensor provides data indicative of movement of the mobile device 100 to the data conditioning module 132. The magnetometer sensor module 116 detects strength and direction of magnetic fields and provides data indicative of compass directions (e.g., north) relative to movement of the mobile device 100 to the data conditioning module 132. The other sensor modules 120 may provide other data indicative of, for example only, position, location, movement, and/or orientation of the mobile device based on sensed characteristics to the data conditioning module 132. For example, the other sensor modules 120 may include a barometer sensor that senses atmospheric pressure and provides data indicative of an altitude of the mobile device 100 to the data conditioning module 132.

The GNSS module 124 includes a GPS or other satellite navigate system receiver and provides data indicative of a location of the mobile device 100 to the data conditioning module 132. For example, the GNSS module 124 communicates with satellites (not shown) of a remote GNSS to determine the location of the mobile device 100. The wireless communication module 128 includes a Wi-Fi or other local area network receiver and provides data indicative of the location of the mobile device 100 to the data conditioning module 132. For example, the wireless communication module 128 communicates with an access point or base station of a local (i.e., within range) wireless local area network to determine the location of the mobile device 100.

The data conditioning module 132 receives the data from each of the navigation devices 104 and outputs conditioned navigation data accordingly. For example, the data conditioning module 132 may filter, calibrate, and/or selectively disregard raw data received from the navigation devices 104. For example, the data conditioning module 132 may determine an integrity of the data received from one of the navigation devices 104—e.g., whether the data received from one of the navigation devices 104 is faulty or invalid due to the respective one of the navigation devices 104 being out of calibration or otherwise unreliable (e.g., malfunctioning). In other words, the data conditioning module 132 may determine integrity information associated with each of the navigation devices 104. Accordingly, the navigation data output from the data conditioning module 132 may not include data received from any of the navigation devices 104 that are unreliable.

The navigation data including the data received from the various navigation devices 104 is provided to a mode selection module 136. The mode selection module 136 is configured to select and transition between navigation modes of the mobile device 100. The navigation modes include, for example only, an outdoor vehicle mode, an outdoor pedestrian mode, an indoor vehicle mode, an indoor pedestrian mode, and a static mode. In one embodiment, the outdoor vehicle mode and the indoor vehicle mode correspond to modes in which the mobile device 100 is within a vehicle and the vehicle is moving. In the outdoor vehicle mode, the vehicle is not within, for example, a structure, such as a parking structure or a tunnel. In the indoor vehicle mode, the vehicle may be moving within a parking structure or a tunnel. In another embodiment, the outdoor pedestrian mode and the indoor pedestrian mode correspond to modes when the mobile device 100 is being moved between locations via a pedestrian (or user). In the outdoor pedestrian mode, the user is moving the mobile device 100 between outdoor locations. In the indoor pedestrian mode, the user is moving the mobile device 100 between indoor locations (e.g., between shops in a shopping mall). In another embodiment, the mobile device 100 is not be moved while in the static mode. The navigation modes correspond to a determined location and usage of the mobile device 100 (i.e., whether the mobile device 100 is being used in a vehicle or by a pedestrian, and whether the mobile device 100 is an outdoor or indoor location). Further, each of the navigation modes is associated with respective operating modes of the navigation devices 104.

For example, in one or more of the navigation modes, all of the navigation devices 104 are operated in the active mode. In others of the navigation modes, one or more of the navigation devices 104 are operated in the active mode, and one or more others of the navigation devices 104 are operated in the inactive mode or the sleep mode. The mode selection module 136 selects and transitions between the navigation modes based on the navigation data received from the data conditioning module 132.

One of the navigation devices 104 may always be operated in the active mode. For example only, the accelerometer sensor module 108, which has relatively low power consumption with respect to the other navigation devices 104, may always be operated in the active mode. Accordingly, regardless of which navigation mode the mobile device 100 is operating in, the accelerometer sensor module 108 is always active and providing data to the data conditioning module 132. Further, the data conditioning module 132 provides navigation data including at least the data received from the accelerometer sensor module 108 to the mode selection module 136 in all of the navigation modes. The mode selection module 136 transitions between the navigation devices based on the data received from the accelerometer sensor module 108.

The accelerometer sensor module 108 detects changes in velocity (i.e., magnitude and direction) of the mobile device 100, including rotation. Accordingly, direction and magnitude of the changes in velocity detected by the accelerometer sensor module 108 are indicative of whether the mobile device 100 is being used in a vehicle or by a pedestrian. For example, changes in velocity that are greater than or equal to a threshold indicate that the mobile device 100 is being used in a vehicle, and therefore correspond to the outdoor vehicle mode or the indoor vehicle mode. Conversely, changes in velocity that are within the threshold indicate that the mobile device 100 is being used by a pedestrian, and therefore correspond to the outdoor pedestrian mode or the indoor pedestrian mode. No change in velocity (e.g., no change in velocity for a predetermined period) indicates that the mobile device 100 is not moving, and therefore corresponds to the static mode. For example, in the static mode, all of the navigation devices 104 other than the accelerator sensor module 108 are in the inactive mode or other reduced power mode.

Other data may indicative of whether the mobile device 100 is in an indoor location or an outdoor location. For example, if the mobile device 100 is in a vehicle and communication with the GNSS is blocked, the mobile device 100 may be in an indoor location such as a parking structure, underground parking lot, or a tunnel. Conversely, if the mobile device 100 is being used by a pedestrian and communication with the GNSS is blocked, the mobile device 100 may be in an indoor location such as a home, office building, department store, or other structure. Accordingly, signal strengths of GNSS signals received by the GNSS module 124 are indicative of whether the mobile device 100 is in an indoor location or an outdoor location. For example, a signal strength greater than or equal to a threshold may indicate that the mobile device 100 is in an outdoor location. Alternatively, a signal strength less than the threshold may indicate that the mobile device 100 is in an indoor location. Or, a wireless communication signal received by the wireless communication module 128 may be indicative of whether the mobile device 100 is in an indoor location or an outdoor location. Other data including, for example only, data received from and/or generated by the other sensor modules 120 may be used to determine whether the mobile device 100 is in an indoor location or an outdoor location.

Accordingly, the mode selection module 136 determines whether the mobile device 100 is being used in a vehicle or by a pedestrian, and whether the mobile device 100 is in an indoor location and an outdoor location. The mode selection module 136 selects one of the navigation modes (e.g., the outdoor vehicle mode, the outdoor pedestrian mode, the indoor vehicle mode, the indoor pedestrian mode, and the static mode) based on the determinations. Further, a user of the mobile device 100 may input a desired navigation mode (e.g., via a user interface 140). A mobile device control module 144 receives the desired navigation mode from the user interface 140 and provides the desired navigation mode to the mode selection module 136. The mode selection module 136 selects the navigation mode based on the desired navigation mode input by the user. Further, in some implementations, the mobile device control module 144 and/or another component of the mobile device 100 generates the desired navigation mode. In other implementations, the mode selection module 136 selects the navigation mode further based on the integrity information.

Each of the navigation modes corresponds to modes (e.g., active, inactive, sleep and/or reduced power modes) of the navigation devices. For example, in the static mode, only the accelerometer sensor module 108 is in the active mode, and the remaining navigation devices 104 are in the inactive, sleep, and/or reduced power modes. In the outdoor vehicle mode and the outdoor pedestrian mode, if the signal quality of the received GNSS signal is "bad" (e.g., less than a first threshold), the GNSS module 124 is in the active mode and all of the remaining navigation devices 104 are in the active mode to provide additional navigation data. The resolution of the GNSS module 124 may also be reduced. If the signal quality of the received GNSS signal is "moderate" (e.g., greater than or equal to the first threshold and less than a second threshold), the GNSS module 124 is in the active mode or reduced power mode and the remaining navigation devices 104 are in the sleep or reduced power mode. If the signal quality of the received GNSS signal is "good" (e.g., greater than or equal to the second threshold), the GNSS module 124 is in the active mode and the remaining navigation devices 104 are in the inactive mode. Conversely, in the indoor vehicle mode and the indoor pedestrian mode, the GNSS module 124 is in the inactive mode and the remaining navigation devices 104 are in the active mode.

The mode selection module 136 communicates the selected navigation mode to a power management module 148 and a navigation control module 152. The power management module 148 controls the respective modes of the navigation devices 104 based on the selected navigation mode. The navigation control module 152 receives the navigation data and provides integrated navigation data to the mobile device control module 144 based on the integrated navigation data. For example, the navigation control module 152 receives the navigation data from each of the navigation devices 104 in the active mode. The navigation control module 152 filters and combines the navigation data to generate the integrated navigation data. The integrated navigation data may include, for example only, position data, velocity data, and other location data based on all of the navigation data received from the navigation devices 104 in the active mode. For example only, the navigation control module 152 includes a Kalman filter that filters and combines the navigation data.

Figure 2:
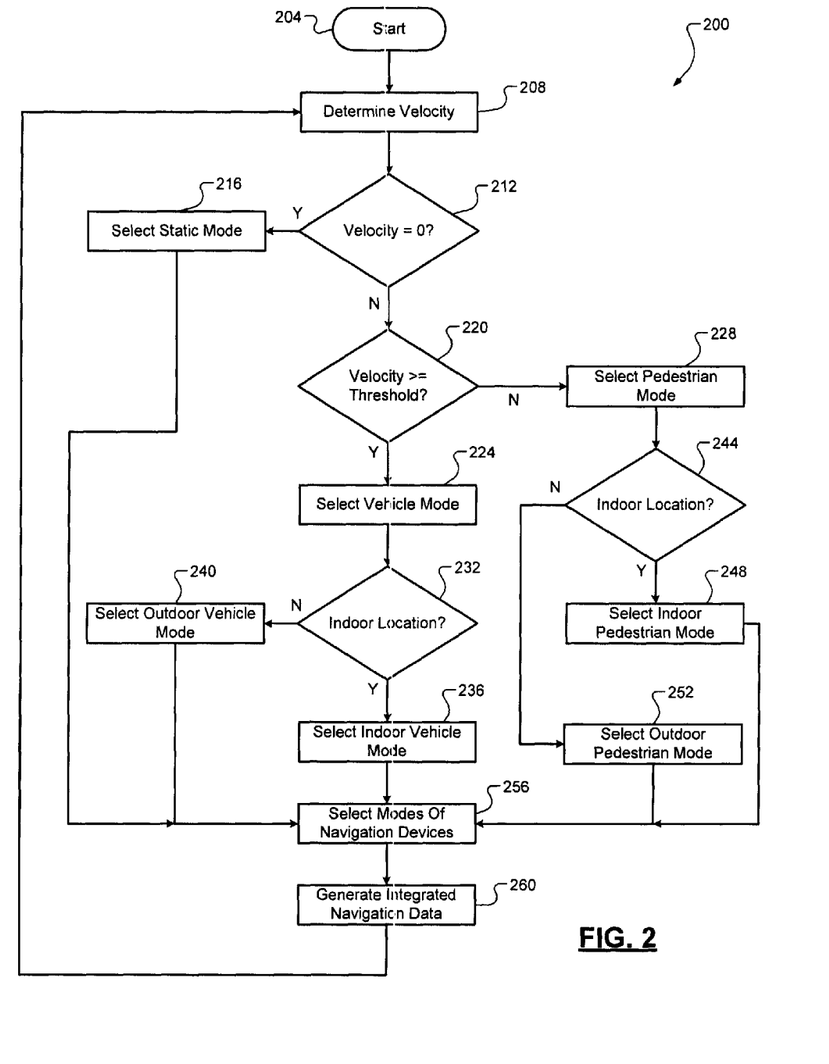
FIG. 2 illustrates a method of operating a mobile device according to an embodiment of the present disclosure.

Referring now to FIG. 2, a method 200 of operating a mobile device begins at 204. At 208, the method 200 determines a velocity of the mobile device using, for example only, data received from an accelerometer. The method 200 determines whether the velocity is zero at 212. If true, the method 200 selects a static mode at 216. If false, the method 200 determines whether the velocity is greater than or equal to a threshold at 220. If true, the method 200 selects a vehicle mode at 224. If false, the method 200 selects a pedestrian mode at 228.

At 232, the method 200 determines whether the mobile device is in an indoor location. For example, the method 200 determines whether the mobile device is in an indoor location based on a signal strength (e.g., quality) of a GNSS signal received by the mobile device. If true, the method 200 continues to 236. If false, the method 200 continues to 240. At 236, the method 200 selects an indoor vehicle mode. At 240, the method 200 selects an outdoor vehicle mode.

At 244, the method 200 determines whether the mobile device is in an indoor location. For example, the method 200 determines whether the mobile device is in an indoor location based on a signal strength (e.g., quality) of a GNSS signal received by the mobile device. If true, the method 200 continues to 248. If false, the method 200 continues to 252. At 248, the method 200 selects an indoor pedestrian mode. At 252, the method 200 selects an outdoor pedestrian mode.

At 256, the method 200 selects modes (e.g., active, inactive, and sleep and/or reduced power modes) of navigation devices of the mobile device based on the selected navigation mode. At 260, the method 200 generates integrated navigation data based on navigation data provided by navigation devices in the active mode.

Figure 3:
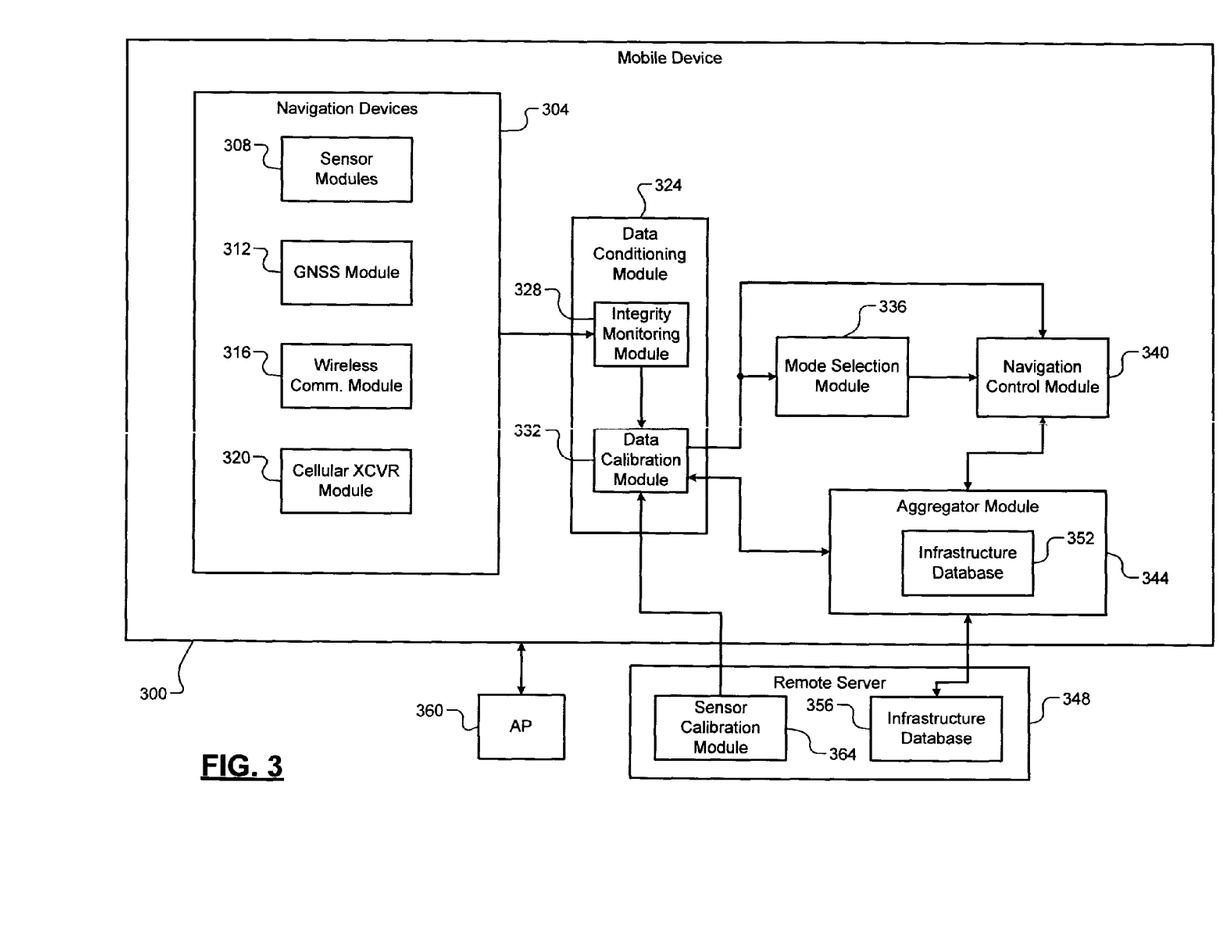
FIG. 3 is a functional block diagram of another example mobile device according to an embodiment of the present disclosure.

Referring now to FIG. 3, a mobile device 300 includes navigation devices 304. The navigation devices 304 include sensor modules 308 (e.g., including, but not limited to, the accelerometer sensor module 108, the gyroscope sensor module 112, the magnetometer sensor module 116, and the other sensor modules 120 as shown in FIG. 1), a GNSS module 312, a wireless communication module 316, and a cellular transceiver (XCVR) module 320. The cellular transceiver module 320 transmits and receives cellular signals and may also provide information used for navigation data. For example only, the cellular transceiver module 320 may provide cell identification (cell-ID) data and/or received signal strength information (RSSI).

The mobile device 300 includes a data conditioning module 324. The navigation devices 304 provide data as described in FIG. 1 to the data conditioning module 324. For example, the navigation devices 304 provide the data to an integrity monitoring module 328. The integrity monitoring module 328 monitors integrity (e.g., reliability) of each of the navigation devices 304 to determine integrity information for each of the navigation devices 304, and selectively provides the data to a data calibration module 332. The data calibration module 332 outputs navigation data corresponding to the data provided by the navigation devices 304. For example, the data calibration module 332 may adjust the navigation data based on calibration data specific to respective ones of the navigation devices 304.

A mode selection module 336 is configured to select and transition between navigation modes of the mobile device 300 as described above with respect to FIG. 1. The mode selection module 336 communicates the selected navigation mode to a navigation control module 340. The navigation control module 340 receives the navigation data and provides integrated navigation data as described above with respect to FIG. 1. Those skilled in the art can appreciate that although the mobile device 300 as shown in FIG. 3 omits, for clarity, some of the structure of the mobile device 100 of FIG. 1 (e.g., the power management module 148, the mobile device control module 144, and the user interface 140), the mobile device 300 may include any of the structure described in FIG. 1. Conversely, the mobile device 100 may include any of the structure described in FIG. 3.

The mobile device 300 includes an aggregator module 344 that communicates with the data conditioning module 324 (e.g., via the measurement module 332), the navigation control module 340, and/or a remote server 348. For example, the aggregator module 344 receives the navigation data from the data conditioning module 324. The aggregator module 344 receives wireless information from the remote server 348. The wireless information may correspond to positioning information including, for example only, information about access points (APs) located near (e.g., within connection range of) the mobile device 300, a cell-ID, and/or other positioning information. The aggregator module 344 receives the integrated navigation data from the navigation control module 340.

The aggregator module 344 aggregates the wireless information, the navigation data, and the integrated navigation data and stores aggregated information based on the wireless information, the navigation data, and the integrated navigation data in an infrastructure database 352. The aggregator module 344 provides portions of the aggregated information to the data conditioning module 324, the navigation control module 340, and the remote server 348. For example, the aggregated information may also be stored in and/or received from an infrastructure database 356 located on the remote server 348.

The aggregated information corresponds to a plurality of types of positioning information associated with a location of the mobile device 300. For example, if GNSS data is not available (e.g., the mobile device 300 is in an indoor location), the aggregated information may be used to determine the location of the mobile device 300. In particular, the aggregated information may include wireless infrastructure info associated with wireless communication and cellular communication. For example, the wireless infrastructure information associated with the wireless communication may include, but is not limited to, locations of known APs within range of the mobile device 300 (e.g., AP coordinates) and corresponding service set identifiers (SSIDs), media access controller (MAC) addresses, and/or received channel power indicators (RCPIs). The wireless infrastructure info associated with the cellular communication may include, but is not limited to, a Cell-ID, RSSI, and/or cell tower coordinates. The aggregated information may be stored in either of, and/or shared between, the infrastructure database 352 and the infrastructure database 356.

If the mobile device 300 is wirelessly connected to an AP 360 (e.g., via the wireless communication module 316), the mobile device 300 may retrieve wireless infrastructure information associated with the AP 360 and provide the wireless infrastructure information to the navigation control module 340 and/or the measurement module 332. For example, a location of the AP 360 is indicative of a location of the mobile device 300. If the location of the AP 360 (e.g., AP coordinates) is known, then various other information can be used to determine the location of the mobile device 300. For example, the RCPI associated with the connection between the mobile device 300 and the AP 360 is indicative of a distance between the mobile device 300 and the AP 360. Accordingly, if the location of the AP 360 is known, then the location of the mobile device 300 can be approximated using the RCPI.

The infrastructure database 352 (and/or the infrastructure database 356) may store, for each known AP, wireless communication position information such as a MAC address, corresponding x, y, and z coordinates, and a corresponding wireless propagation (or channel) model A, n. For example, the infrastructure database 352 stores a lookup table indexed by MAC addresses. If the wireless device 300 is connected to an AP having a particular MAC address, the x, y, and z coordinates and the wireless propagation model A, n associated with the MAC address are retrieved accordingly.

The wireless propagation model A and n correspond to wireless propagation behavior for signals transmitted from the corresponding AP. For example, A corresponds to transmission power associated with the AP, and n corresponds to a propagation constant associated with the AP. The propagation constant may correspond to whether the AP is in an indoor location or an outdoor location, whether the AP is embedded (e.g., in a wall), and other factors that affect transmission of signals from the AP. Accordingly, the location of the mobile device 300 can be approximated using, in addition to the RCPI, the x, y, and z coordinates and the propagation model A, n. Further, if the x, y, and z coordinates are not known, the x, y, and z coordinates can be determined using the propagation model and a known location of the mobile device 300.

Similarly, the infrastructure database 352 (and/or the infrastructure database 356) may store, for each known cell (i.e., each cell in a cellular communication system), cellular position information indexed by a mobile country code (MCC), a mobile network code (MNC), a local area code (LAC) and/or a cell ID. For example, the infrastructure database 352 stores a lookup table indexed by MCC, MNC, and cell ID. If the wireless device 300 is in a cell having a particular cell ID, the cellular position information is retrieved accordingly. The cellular position information includes, for example only propagation (or channel) models based on x, y, and z coordinates and a timing offset t for the cell, transmission power A of a corresponding cell tower, and directional info h (e.g., a direction of the cell tower with respect to the mobile device 300). Accordingly, the location of the mobile device 300 can be approximated using the propagation models and the x, y, and z coordinates, the timing offset t, the transmission power A, and the directional info h.

Accordingly, if GNSS data is not available to the mobile device 300, the navigation control module 340 can use at least the aggregated information to determine the integrated navigation data. Further, if there is no AP within range, the aggregated information may still include cellular position information. Conversely, if the mobile device 300 is not receiving a cellular signal, the aggregated information may still include wireless communication position information.

The remote server 348 (and/or the aggregator module 344) may also include a sensor calibration module 364 that provides sensor calibration data to the mobile device (e.g., the measurement module 332). The sensor calibration data corresponds to, for example, calibration parameters to the data provided by the sensor modules 308. For example, the calibration parameters may correspond to a particular location of the mobile device 300. The measurement module 332 uses the calibration parameters to adjust the sensor data accordingly.

For example, as described above, barometric pressure is indicative of an altitude of the mobile device 300. However, a ground level in different locations may have different altitudes (e.g., with respect to sea level). Accordingly, barometric pressure at a ground level may vary in different locations, and the calibration parameters for a barometer of the mobile device 300 correct for differences in ground level by location. As another example, with respect to a magnetometer, an declination angle between true north and magnetic north, as well as local magnetic strength, vary by location. Accordingly, readings by the magnetometer may vary in different locations, and calibration parameters for the magnetometer of the mobile device 300 correct by location. In this manner, if the location of the mobile device 300 is known (e.g., according to GNSS data, wireless communication data, and/or the aggregation information), the sensor calibration module 364 provides the calibration parameters corresponding to each of the sensor modules 308 based on the known location. The calibration parameters may also include and/or be based on, for example only, biases, scale factors, temperature factors, and/or error modeling information (e.g., white noise, random walk, an nth order Guass-Markov process, etc.).

Figure 4:
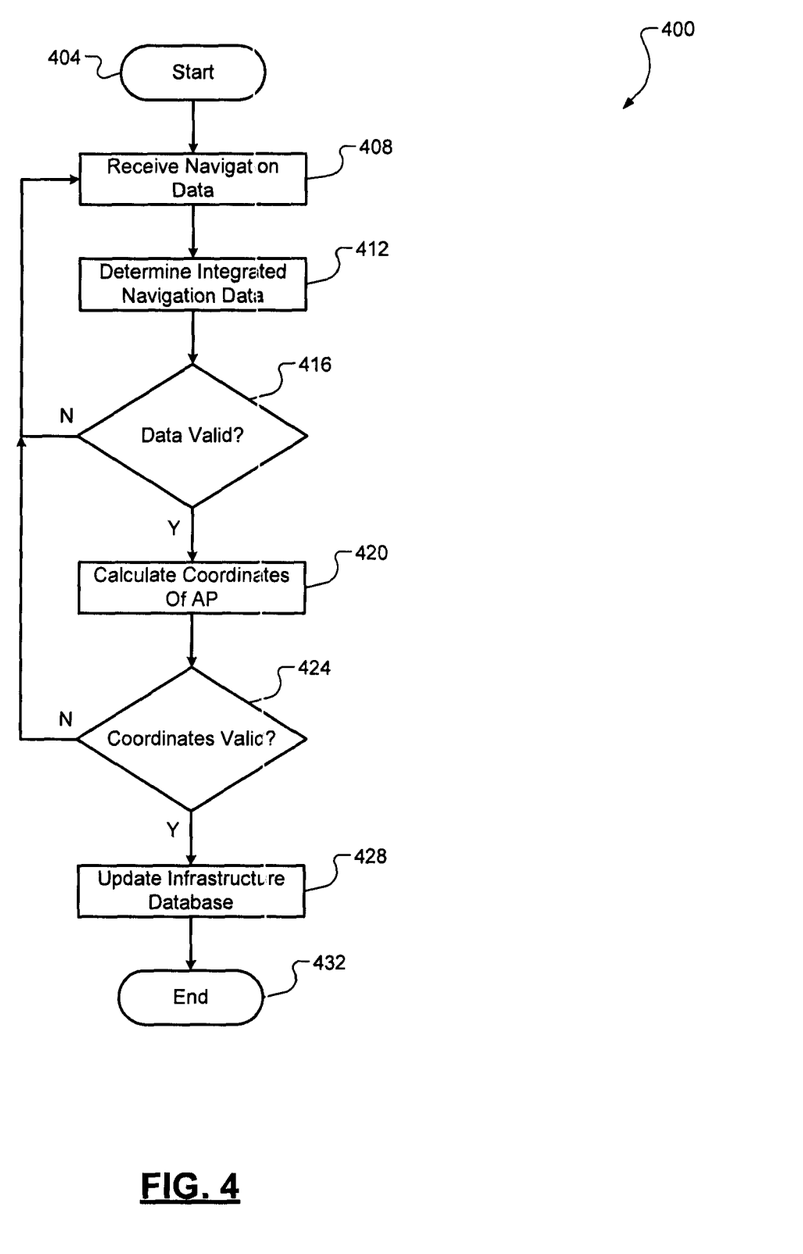
FIG. 4 illustrates a wireless infrastructure information method according to an embodiment of the present disclosure.

Referring now to FIG. 4, an example wireless infrastructure information method 400 begins at 404. At 408, the method 400 receives, from navigation devices, navigation data including, but not limited to, data input from various sensors, GNSS data, and wireless communication data. At 412, the method 400 determines integrated navigation data based on the received navigation data. At 416, the method 400 determines whether the integrated navigation data is valid. For example, the method 400 determines whether the navigation data was collected for a sufficient period and/or whether sufficient navigation data was received from the navigation devices. If true, the method 400 continues to 420. If false, the method 400 continues to 408.

At 420, the method 400 calculates coordinates of an AP connected to a mobile device using a wireless propagation model based on wireless infrastructure information. For example, the model may correspond to RCPI=−(10*n*log 10 d+A), where n is propagation constant, d is a distance between the wireless device and the AP, and A is a signal strength constant. Accordingly, the method 400 calculates the coordinates of the AP using the model and a known location of the mobile device. At 424, the method 400 determines whether the calculated coordinates are valid. If true, the method 400 continues to 428. If false, the method 400 continues to 408. At 428, the method 400 updates an infrastructure database using the calculated coordinates. The method 400 ends at 432.

Figure 5:
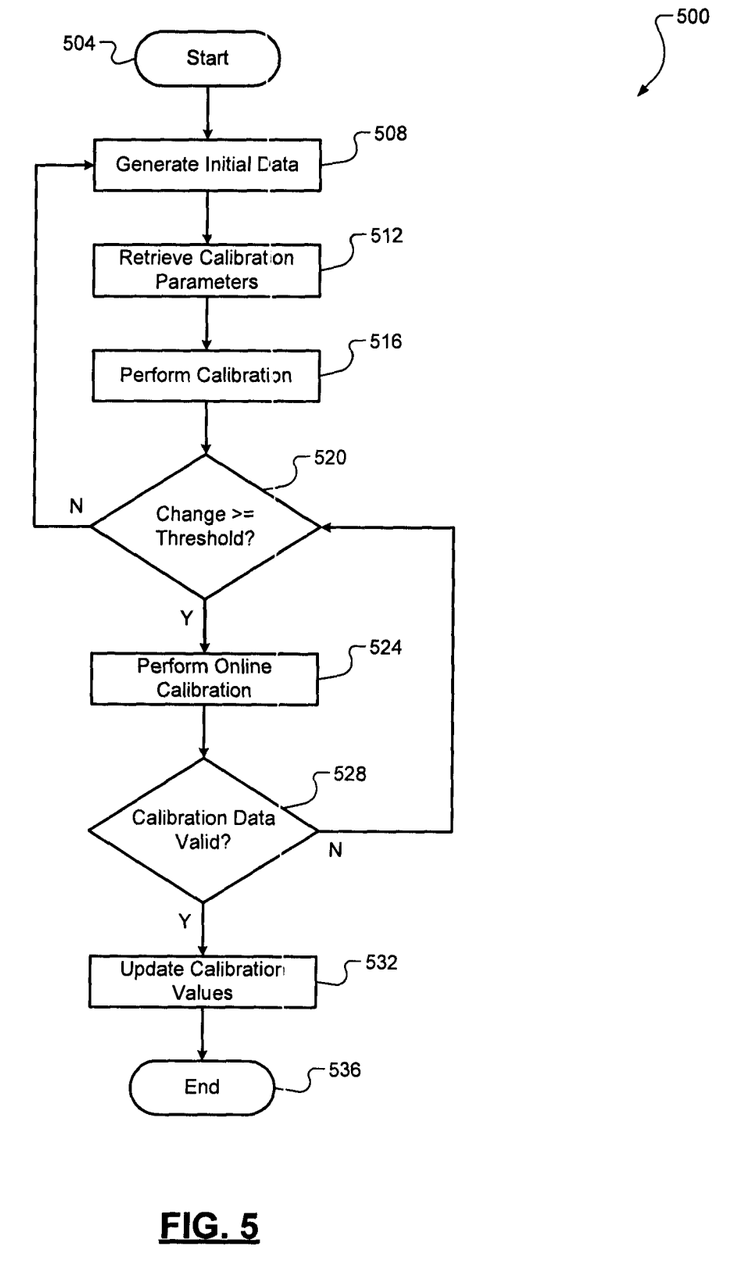
FIG. 5 illustrates a magnetometer calibration method according to an embodiment of the present disclosure.

Referring now to FIG. 5, an example magnetometer calibration method 500 begins at 504. At 508, the method 500 generates initial data (e.g., a sensed position) using the magnetometer. At 512, the method 500 retrieves calibration parameters from an infrastructure database based on a location of the mobile device. For example, the calibration parameters may include adjustments based on a local declination angle and a local magnetic field strength. At 516, the method 500 performs a calibration on the initial data using the calibration parameters. At 520, the method 500 determines whether a change in the sensed position due to the calibration is greater than or equal to a threshold. If true, the method 500 continues to 524. If false, the method 500 continues to 508.

At 524, the method 500 performs online calibration (e.g., calibration at a remote server) based on the initial data and applies the calibration to the data. For example, the calibration may be based on H'=−arc tan(−cos γ*$m_x$+sin γ*$m_z$)/(sin θ sin γ*$m_x$+cos θ*$m_y$,−sin θ cos γ*$m_z$), where θ is a pitch angle of the mobile device, γ is a roll angle of the mobile device, m corresponds to x, y, and z coordinates, and H' is a magnetic north heading. Further, H=H'+α, where H is a true north heading and α is a declination angle. At 528, the method 500 determines whether the calibrated data is valid. If true, the method 500 continues to 532. If false, the method 500 continues to 520. At 532, the method 500 updates calibration values stored on the mobile device based on the online calibration. The method 500 ends at 536.

Figure 6:
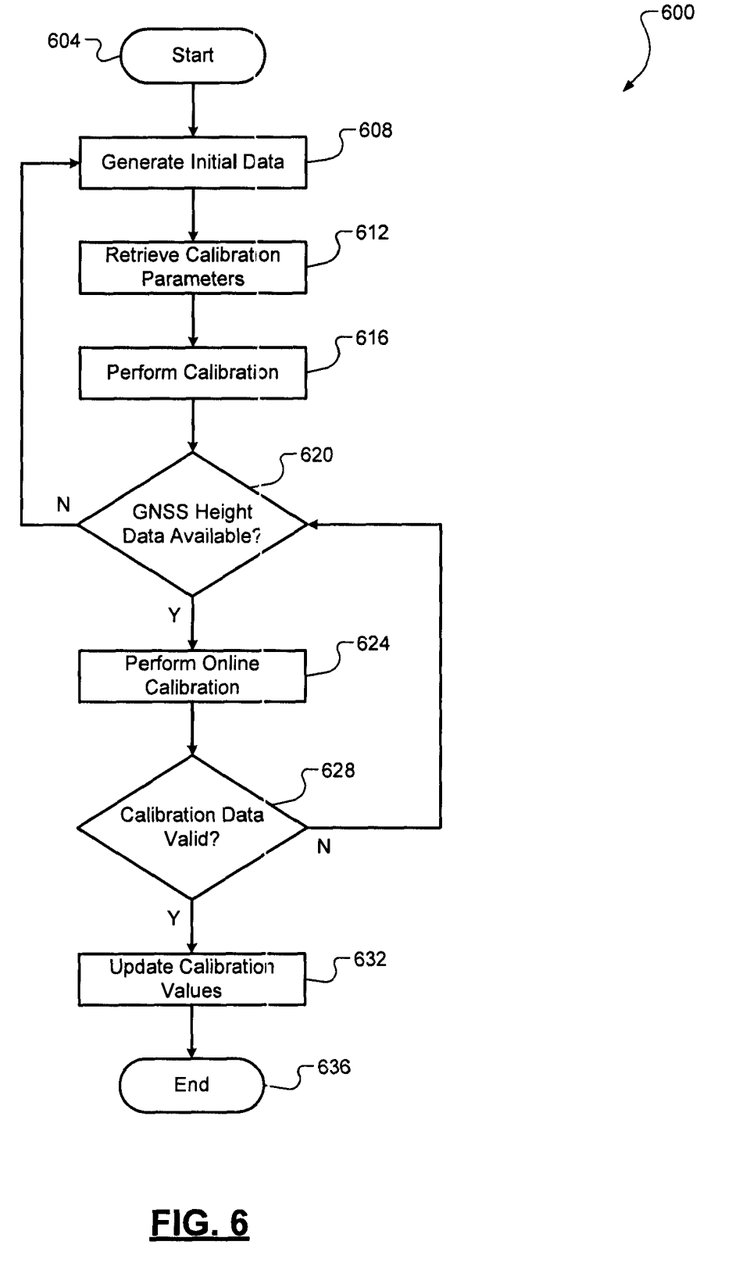
FIG. 6 illustrates a barometer calibration method according to an embodiment of the present disclosure.

Referring now to FIG. 6, an example barometer calibration method 600 begins at 604. At 608, the method 600 generates initial data (e.g., a sensed height/altitude of the mobile device) using the barometer. At 612, the method 600 retrieves calibration parameters from an infrastructure database based on a location of the mobile device. For example, the calibration parameters may include adjustments based on a local air pressure. At 616, the method 600 performs a calibration on the initial data using the calibration parameters. At 620, the method 600 determines whether height data provided by a GNSS is available. If true, the method 600 continues to 624. If false, the method 600 continues to 608.

At 624, the method 600 performs online calibration (e.g., calibration at a remote server) based on the initial data and applies the calibration to the data. For example, the calibration may be based on the initial data and the GNSS height data. For example, the method 600 performs the calibration based on $H=T/(-dT/dH)*[1-(P/P_0)^{(-dT/dH)*R/g}]$, where T is a measured temperature (e.g., Kelvin), dT/dH is a temperature gradient (e.g., −6.5, Kelvin/km), P is a pressure sensed by the barometer (e.g., mbar), $P_0$ is standard atmospheric pressure (e.g., 1013.25 mbar), R is a gas constant (e.g. 287.052, $m^2/s^2$/Kelvin), and g is gravity ($m/s^2$).

At 628, the method 600 determines whether the calibrated data is valid. If true, the method 600 continues to 632. If false, the method 600 continues to 620. At 632, the method 600 updates calibration values stored on the mobile device based on the online calibration. The method 600 ends at 636.

Figure 7:
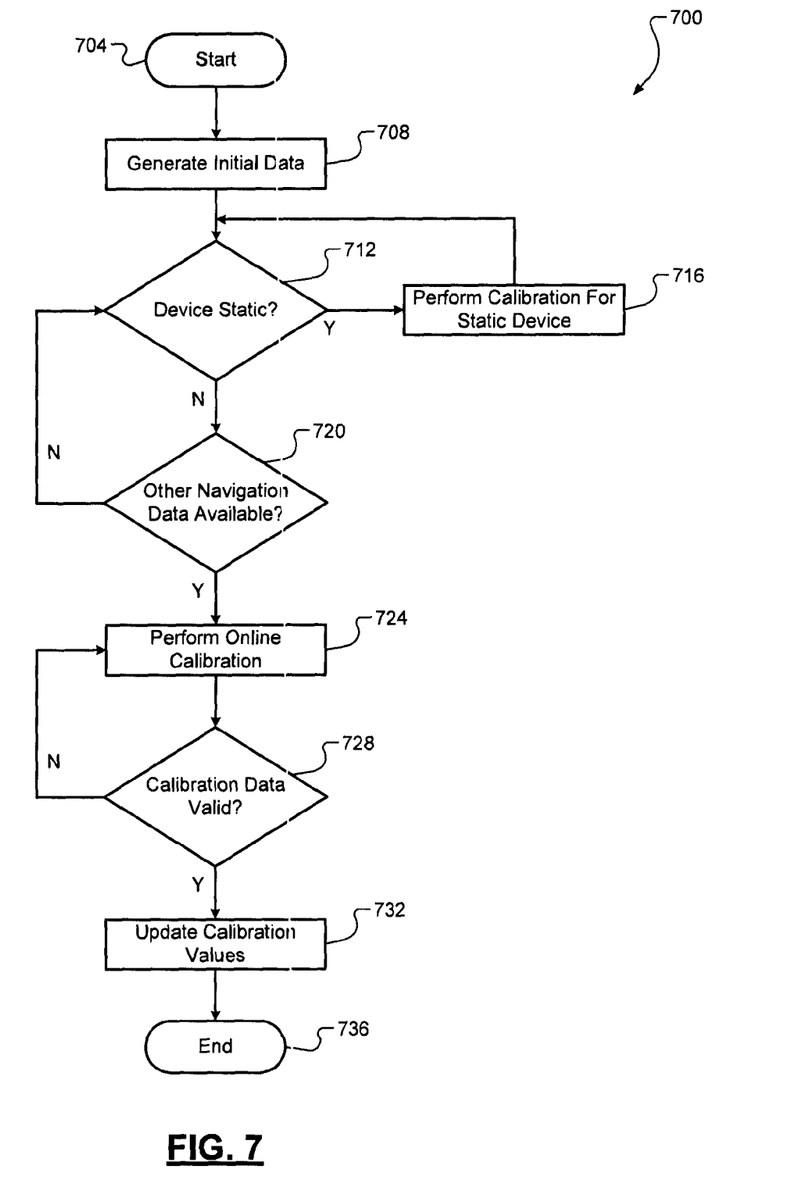
FIG. 7 illustrates a gyroscope/accelerometer calibration method according to an embodiment of the present disclosure.

Referring now to FIG. 7, an example gyroscope (and/or accelerometer) calibration method 700 begins at 704. At 708, the method 700 generates initial data using the gyroscope according to initial calibration parameters. At 712, the method 700 determines whether the mobile device is static (e.g., in a static mode). If true, the method 700 performs calibration of the gyroscope according to zero-rate output measurement for a static device at 716. If false, the method 700 continues to 720. At 720, the method 700 determines whether other navigation data is available. If true, the method 700 continues to 724. If false, the method 700 continues to 712.

At 724, the method 700 performs online calibration (e.g., estimation sensor parameters in Kalman filter) based on the initial data and applies the calibration to the data. For example, the calibration may be based on the initial data and further based on data from other sensors, a GNSS module, and/or a wireless communication module. At 728, the method 700 determines whether the calibrated data is valid. If true, the method 700 continues to 732. If false, the method 700 continues to 724. At 732, the method 700 updates calibration values stored on the mobile device based on the online calibration. The method 700 ends at 736.

Figure 8:
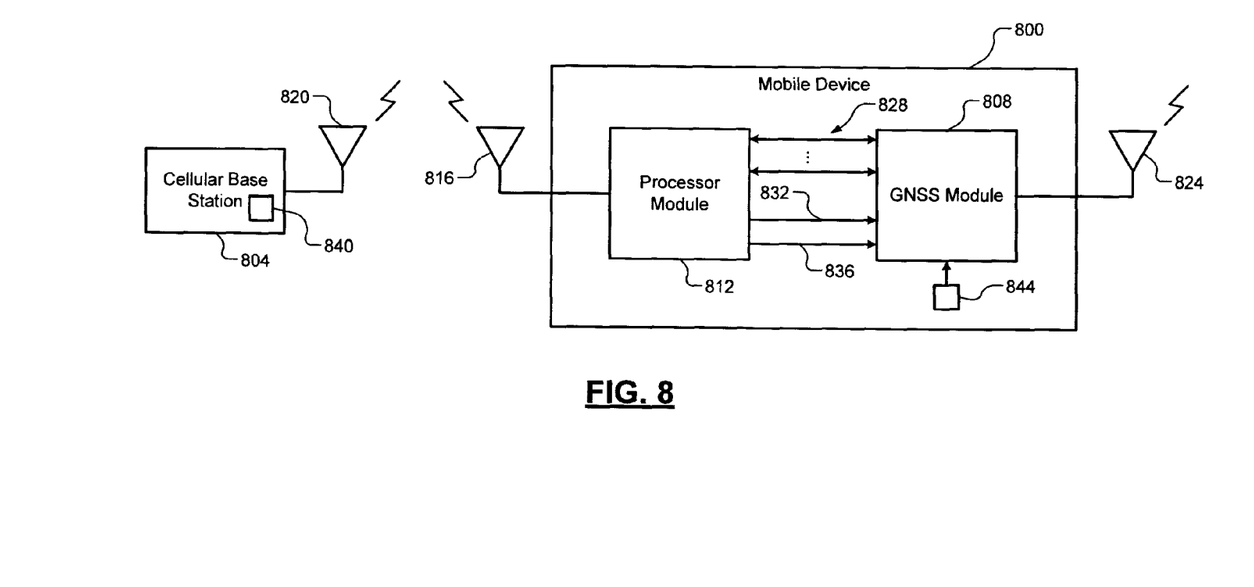
FIG. 8 is a functional block diagram of a mobile device implementing frequency and time aiding according to an embodiment of the present disclosure.

Referring now to FIG. 8, another implementation of a mobile device 800 is shown. The mobile device 800 implements frequency and/or time aiding. For example, the mobile device 800 provides the frequency and/or time aiding from a cellular base station 804 to a GNSS module 808 via a processor module 812 (e.g., a communication processor, an application processor, and/or a combined communication/application processor). For example only, the cellular transceiver module 320 as shown in FIG. 3 may include the processor module 812. The mobile device 800 communicates with the cellular base station 804 via an antenna 816. For example, the processor module 812, via the antenna 816, transmits cellular signals to and receives cellular signals from an antenna 820 of the cellular base station 804. Similarly, the GNSS module 808 receives GNSS signals via an antenna 824.

The processor module 812 provides data (e.g, data received via the cellular signals) to the GNSS module 808. For example, the processor module 812 provides the data via data lines (e.g., universal asynchronous receiver/transmitter, or UART, lines) 828. The data may include data packets (i.e., frames) received via the cellular signals. Further, the processor module 812 according to the principles of the present disclosure provides frequency and time aiding information including frequency information (e.g., a frequency aiding clock signal 832) and time information (e.g., a time pulse 836). For example only, the time pulse 836 is a pulse signal having a configurable pulse width. The GNSS module 808 uses the frequency and time aiding information to improve communication performance of the GNSS module 808. For example, the GNSS module 808 may use the frequency and time aiding information to narrow a GNSS search range, reducing a time to first fix (TTFF), and improve receiver sensitivity. The mobile device 800 may implement the frequency and time aiding information regardless of whether the mobile device 800 is registered for assisted GPS (A-GPS) service.

The cellular base station 804 operates according to a clock source 840 located within the cellular base station 804. Accordingly, the cellular base station 804 communicates with the mobile device 800 using the clock source located within the cellular base station 804. Conversely, the GNSS module 808 operates according to a local clock source 844. Typically, the clock source 840 is significantly more stable (i.e., more accurate) than the local clock source 844. For example, the cellular base station 804 may require a clock accuracy of 0.05 parts per million (ppm), and in a worst case scenario the clock source 840 may have an accuracy of 0.1 ppm. Conversely, the local clock source 844 may have an accuracy of 0.5 ppm.

The processor module 812 communicates with the cellular base station 804 at a frequency of the clock source 840, and recovers the frequency from communication with the cellular base station 804. For example only, the frequency may be approximately 26 MHz. The processor module 812 generates the frequency aiding clock signal 832 at the recovered frequency. Accordingly, the frequency aiding clock signal 832 is synchronized to the frequency of the clock source 840.

The GNSS module 808 uses the frequency aiding clock signal 832 as a reference clock signal to compensate for (e.g. correct) inaccuracies in the local clock source 844. For example, if the frequency associated with the cellular base station 804 is known, then the frequency of the frequency aiding clock signal 832 is also known, and the GNSS module 808 can use the frequency aiding clock signal 832 as a reference clock signal having a known frequency. In other words, the GNSS module 808 performs frequency aiding (e.g., calibrate the frequency of the local clock source 844) using the frequency aiding clock signal 832.

The GNSS module 808 may store information indicating known frequencies of respective cellular base stations. For example, cellular base stations may be indexed by a base station number (i.e., ID) with a respective frequency in a table. If the mobile device 800 is communicating with a cellular base station in the table, then the GNSS module 808 retrieves the associated known frequency from the table and uses the frequency aiding clock signal 832 and the known frequency to perform frequency aiding. For example, the cellular base station 804 may be associated with a frequency of 26.00001 MHz. Another cellular base station may be associated with a frequency of 26.00000 MHz. Further, even if the cellular base station 804 is not in the table, the GNSS module 808 may assume a frequency (e.g., a nominal frequency of 26.00000 MHz) for the cellular base station 804 with accuracy within 0.2 ppm.

Accordingly, when GNSS communication is available (i.e., a GNSS signal is being received), the location of the mobile device 800 can be determined, and therefore a location and identification of the cellular base station 804, as well as an associated frequency of the clock source 840, can be determined. The GNSS module 808 updates and maintains the table with the base station identification and associated frequency. Conversely, when GNSS communication is not available but a cellular signal from the cellular base station 804 is available, the GNSS module 808 uses the frequency aiding clock signal 832, the associated known frequency, and/or an assumed nominal frequency for frequency aiding.

The GNSS module 808 uses the time pulse 836 and cellular data frames received from the processor module 812 to perform time aiding. In particular, the GNSS module uses the time pulse 836 and the data frames to determine a time interval (e.g., a one-frame time interval) associated with one cellular frame. The GNSS module 808 may store a table indexed by a base station number with a respective one-frame time interval. For example, when GNSS communication is available, the GNSS module 808 uses the time pulse 836 to measure the one-frame time interval of the cellular base station 804, and updates the table accordingly. Conversely, when GNSS communication is not available, the GNSS module 808 uses the stored base station number and respective one-frame time interval to perform time aiding.

Figure 9:
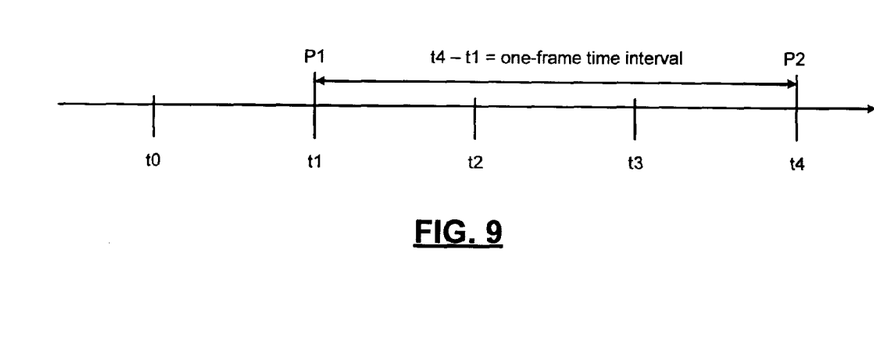
FIG. 9 illustrates one-frame time interval measurement according to an embodiment of the present disclosure.

Referring now to FIGS. 8 and 9, the GNSS module 808 transmits a timing request to the processor module 812 at time t0. In response to the timing request, the processor module 812 transmits a first time pulse P1 at a time t1. The processor module 812 then transmits a cellular data frame at t2. The cellular data frame includes information such as a corresponding frame number and/or a cell base station ID. The frame number may include a time stamp from the cellular base station 804. Subsequent to receiving the cellular data frame, the GNSS module 808 transmits another timing request at t3, followed by the processor module 812 transmitting a second time pulse P2 at t4. The GNSS module determines the one-frame time interval based on the time pulses t4 and t1. Specifically, the one-frame time interval corresponds to a time interval between t1 and t4, or t4-t1. Accordingly, with the one-frame time interval known, the GNSS module 808 performs time aiding using the frame number (i.e., time stamp) and the one-frame time interval associated with cellular data frames being received from the processor module 812.

The GNSS module 808 may transmit a timing request to the processor module 804 prior to transitioning to a sleep mode and store a GPS time and a first frame number of a cellular data frame received in response to the timing request. After transitioning from the sleep mode back to the active mode, the GNSS module 808 transmits another timing request, and receives another cellular data frame and a corresponding second frame number. The GNSS module 808 uses the first frame number, the second frame number, the GPS time, and the one-frame time interval to determine a GPS time associated with the transition back to the active mode (i.e., the GPS time at wakeup). Or, the processor module 812 may transmit the time pulse as a wakeup signal.

The GNSS module 808 may send a request to the processor module 812 to transmit the frequency aiding clock signal 832 and/or the time pulse 836. For example, the GNSS module 808 may send the request when the GNSS module 808 is in a sleep mode. Or, the processor module 812 may provide the frequency aiding clock signal 832 and/or the time pulse 836 as a wakeup signal to cause the GNSS module 808 to transition from the sleep mode to an active mode.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. A mobile device operable in a plurality of navigation modes, the mobile device comprising:
   a plurality of navigation devices configured to provide respective data associated with at least one of movement, a position, and a location of the mobile device, wherein each of the plurality of navigation devices is individually operable in an active mode and at least one of i) an inactive mode and ii) a sleep mode;
   a mode selection module configured to i) receive the respective data and ii) select a first navigation mode of the plurality of navigation modes based on the data received from a first navigation device of the plurality of navigation devices, wherein each of the plurality of navigation modes corresponds to different ones of the plurality of navigation devices being assigned to operate in the active mode; and
   a power management module configured to, based on the selected first navigation mode and the corresponding different ones of the plurality of navigation devices assigned to operate in the active mode, selectively transition the plurality of navigation devices between the active mode and the at least one of i) the inactive mode and ii) the sleep mode.

2. The mobile device of claim 1, wherein the plurality of navigation devices include at least one of an accelerometer sensor module, a gyroscope sensor module, a magnetometer sensor module, a barometer sensor module, a global navigation satellite system (GNSS) module, and a wireless communication module.

3. The mobile device of claim 1, wherein the data received from the first navigation device includes data received from an accelerometer sensor module.

4. The mobile device of claim 1, wherein the data received from the first navigation device corresponds to a velocity of the mobile device.

5. The mobile device of claim 1, wherein the plurality of navigation modes includes at least two or more of a static mode, an indoor vehicle mode, an indoor pedestrian mode, an outdoor vehicle mode, and an outdoor pedestrian mode.

6. The mobile device of claim 5, wherein the mode selection module is configured to select the static mode responsive to the data received from the first navigation device indicating that the mobile device is not moving.

7. The mobile device of claim 5, wherein the mode selection module is configured to select:
the indoor vehicle mode responsive to both i) the data received from the first navigation device indicating that a velocity of the mobile device is greater than or equal to a threshold, and ii) the data received from a second navigation device of the plurality of navigation devices indicating that the mobile device is in an indoor location; and
the outdoor vehicle mode responsive to both i) the data received from the first navigation device indicating that a velocity of the mobile device is greater than or equal to a threshold, and ii) the data received from the second navigation device indicating that the mobile device is in an outdoor location.

8. The mobile device of claim 5, wherein the mode selection module is configured to select:
the indoor pedestrian mode responsive to both i) the data received from the first navigation device indicating that a velocity of the mobile device is less than a threshold, and ii) the data received from a second navigation device indicating that the mobile device is in an indoor location; and
the outdoor pedestrian mode responsive to both i) the data received from the first navigation device indicating that a velocity of the mobile device is less than a threshold, and ii) the data received from the second navigation device indicating that the mobile device is in an outdoor location.

9. The mobile device of claim 1, further comprising:
a cellular transceiver module configured to determine a cell identification of the mobile device;
a wireless communication module configured to determine positioning information for the mobile device based on the respective data; and
a data conditioning module configured to calibrate errors of the plurality of navigation devices based on the cell identification and the positioning information for the mobile device.

10. The mobile device of claim 1, further comprising an aggregator module configured to store calibration parameters for the plurality of navigation devices in at least one of (i) a first database within the mobile device, and (ii) a second database external to the mobile device.

11. The mobile device of claim 10, wherein the aggregator module is configured to:
transmit the calibration parameters to a server; and
receive updated versions of the calibration parameters from the server.

12. The mobile device of claim 10, further comprising:
a cellular transceiver module configured to determine a cell identification of the mobile device; and
a wireless communication module configured to determine positioning information for the mobile device based on the respective data,
wherein the aggregator module is configured to (i) based on the positioning information, derive wireless channel models for a plurality of access points and the cell identification, and (ii) store the wireless channel models in at least one of the first database and the second database.

13. A method of operating a mobile device in a plurality of navigation modes, the method comprising:
providing, via a plurality of navigation devices, respective data associated with at least one of movement, a position, and a location of the mobile device, wherein each of the plurality of navigation devices is individually operable in an active mode and at least one of i) an inactive mode and ii) a sleep mode;
receiving the respective data;
selecting a first navigation mode of the plurality of navigation modes based on the data received from a first navigation device of the plurality of navigation devices, wherein each of the plurality of navigation modes corresponds to different ones of the plurality of navigation devices being assigned to operate in the active mode; and
based on the selected first navigation mode and the corresponding different ones of the plurality of navigation devices assigned to operate in the active mode, selectively transitioning the plurality of navigation devices between the active mode and the at least one of i) the inactive mode and ii) the sleep mode.

14. The method of claim 13, wherein the plurality of navigation devices include at least one of an accelerometer sensor module, a gyroscope sensor module, a magnetometer sensor module, a barometer sensor module, a global navigation satellite system (GNSS) module, and a wireless communication module.

15. The method of claim 13, wherein the data received from the first navigation device includes data received from an accelerometer sensor module.

16. The method of claim 13, wherein the data received from the first navigation device corresponds to a velocity of the mobile device.

17. The method of claim 13, wherein the plurality of navigation modes includes at least two or more of a static mode, an indoor vehicle mode, an indoor pedestrian mode, an outdoor vehicle mode, and an outdoor pedestrian mode.

18. The method of claim 17, further comprising selecting the static mode in response to the data received from the first navigation device indicating that the mobile device is not moving.

19. The method of claim 17, further comprising selecting:
the indoor vehicle mode in response to both i) the data received from the first navigation device indicating that a velocity of the mobile device is greater than or equal to a threshold, and ii) the data received from a second navigation device of the plurality of navigation devices indicating that the mobile device is in an indoor location; and
the outdoor vehicle mode in response to both i) the data received from the first navigation device indicating that a velocity of the mobile device is greater than or equal to a threshold, and ii) the data received from the second navigation device indicating that the mobile device is in an outdoor location.

20. The method of claim 17, further comprising selecting:
the indoor pedestrian mode in response to both i) the data received from the first navigation device indicating that a velocity of the mobile device is less than a threshold, and ii) the data received from a second navigation device indicating that the mobile device is in an indoor location; and
the outdoor pedestrian mode in response to both i) the data received from the first navigation device indicating that a velocity of the mobile device is less than a threshold, and ii) the data received from the second navigation device indicating that the mobile device is in an outdoor location.

\* \* \* \* \*